(No Model.)

J. H. O'HARA.
AIR BRAKE APPARATUS.

No. 519,681. Patented May 8, 1894.

Witnesses:
J. B. McGirr
Chas. W. Parker

Inventor:
John H. O'Hara
by J. S. Barker
his Attorney.

THE NATIONAL LITHOGRAPHING COMPANY,
WASHINGTON, D. C.

UNITED STATES PATENT OFFICE.

JOHN H. O'HARA, OF CHICAGO, ILLINOIS.

AIR-BRAKE APPARATUS.

SPECIFICATION forming part of Letters Patent No. 519,681, dated May 8, 1894.

Application filed June 3, 1893. Serial No. 476,544. (No model.)

*To all whom it may concern:*

Be it known that I, JOHN H. O'HARA, a citizen of the United States, residing at 256 Michigan avenue, city of Chicago, in the county of Cook and State of Illinois, have invented certain new and useful Improvements in Air-Brake Apparatus, of which the following is a specification.

My invention has for its object to improve, in certain respects to be hereinafter pointed out, the automatic air-brake systems now in vogue; and it consists in improvements in the brake cylinder, in the piston working therein, and in other accessory parts used in such an air-brake system, all of the parts of the apparatus to which my invention applies being intended for use upon the cars, the parts of the apparatus upon the locomotive being of any usual or approved construction.

While the invention is particularly adapted for use in automatic air-brake systems for steam railways, yet certain features of the invention are applicable to other styles of braking systems; for instance, the brake cylinder and piston can be used in a tram-car brake device, in which the compressed air is supplied by a pump driven from one of the axles of the car. Therefore I do not wish to be considered as limiting the scope of my invention to the particular systems or devices in connection with which I have illustrated it in the accompanying drawings, wherein—

Figure 1:
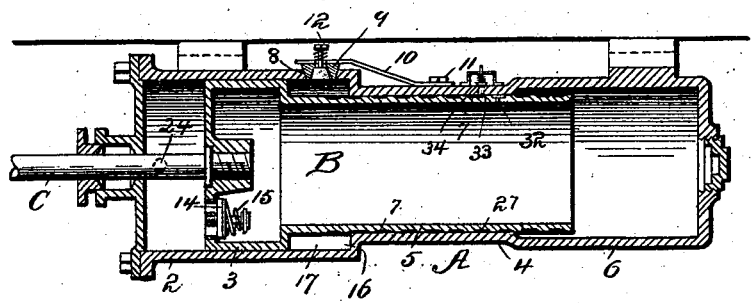
Figure 3:
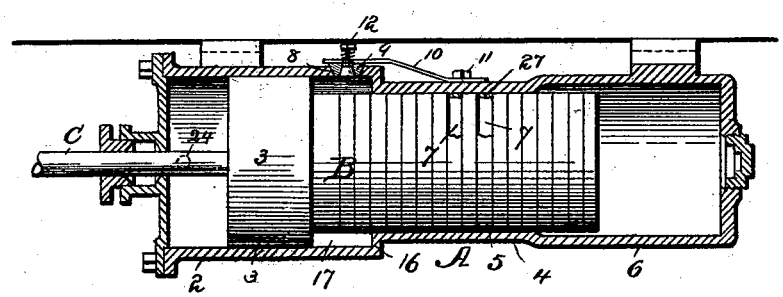
Figure 4:
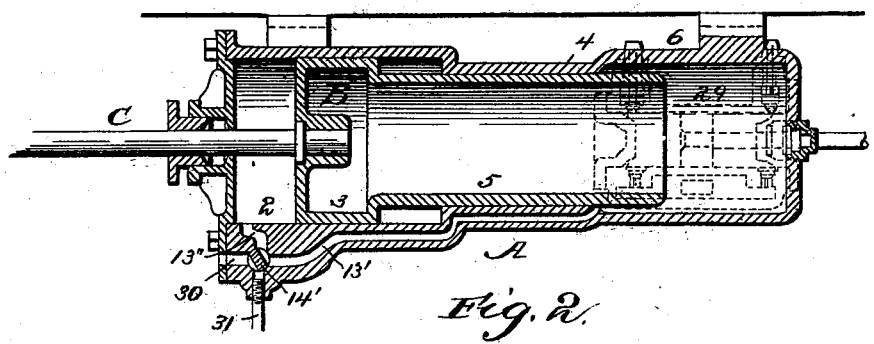
Figure 2:
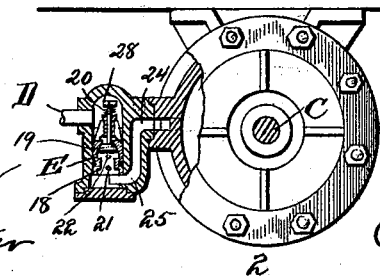

Figure 1 is a longitudinal section through a brake cylinder adapted to be used in connection with an automatic air-brake system, and made according to my invention. Fig. 2 is a sectional end view of the same, the valve device interposed between the train or service pipe and the brake cylinder being in section. Fig. 3 is an elevation of the piston which works in the brake cylinder the latter being in section. Fig. 4 is a longitudinal sectional view through a brake cylinder embodying my invention, and adapted to be used in connection with a pump for furnishing compressed air thereto operated from the car axle.

In the drawings, A represents the brake cylinder, B the piston working therein, C the connecting rod between the piston and the brake levers, and D the train or service pipe. The cylinder is of more than usual length, and is constructed to serve not only as the brake cylinder, but also as the auxiliary reservoir in which compressed air is stored for operating the brakes. The piston is so constructed that the effective areas of its opposite ends, are unequal; that is to say, the area acted upon by the compressed air at one end of the cylinder is greater than that acted upon by the air at the opposite end of the cylinder; and there are provided ports or air passageways, and valves controlling them, whereby the compressed air can be directed so as to act upon one or both ends of the piston, at the pleasure of the operator. The cylinder is constructed to receive a piston of the character just referred to, and to that end it has two portions of different internal diameters with which the piston engages air tight. The portion 2 of the cylinder which is of the largest diameter I term the head end, and with it connects the train or service pipe D. With this portion of the cylinder the head, 3, of the piston engages, and its length is a little more than the length of the piston head plus the distance which the piston moves in applying and letting off the brakes. The piston is provided with a stem portion, 5, which is of smaller diameter than the head, 3,—to which it is connected, or in one piece with which it is formed,—and this part of the piston engages with an intermediate part, 4, of the cylinder. The length of the stem, 5, of the piston, is preferably greater than the length of the portion, 4, of the cylinder with which it engages. I prefer to interpose a packing between the stem of the piston and the portion of the cylinder with which it engages, in order to prevent the escape of the compressed air which may be confined in rear of the piston, and also to reduce friction as much as possible. I prefer that this packing should occupy a considerable portion of the length of the piston rather than it be arranged in a single narrow zone, and to this end I provide the stem of the piston with a shallow groove or grooves, 7, in which is placed some suitable packing material, 27, which will also serve to lubricate the engaging parts of the piston and cylinder. A single spiral groove may be used, or a plurality of separate grooves extending around the piston may be used, as found most desirable. The head, 3, of the piston may, if found desirable, be provided with packing such as that just described. The stem of the piston, and preferably the head, 3, thereof also, are hollow, and have free communication with the rear end of the cylinder, 6, which is closed, and which is preferably of an internal diameter a little greater than that of the portion 4 of the cylinder.

An air passage-way is provided between the opposite ends of the cylinder, so that, when desired, there may be a passage of the compressed air to both ends of the cylinder, which will therefore act on both ends of the piston simultaneously. This passage-way may be through the head of the piston, or it may be formed in the walls of the cylinder, as shown in Fig. 4. In the passage-ways just referred to there are arranged suitable valves, which I will presently describe.

The rear end, 6, of the cylinder and the hollow piston together act as the auxiliary reservoir in which the compressed air is stored ready for use in setting the brakes. As some air may escape from this reservoir past the packing 27, and collect in the space, 17, between the head of the piston and the shoulder 16, which separates the two parts, 2 and 4, of the cylinder, I provide means for allowing such air to escape.

8 indicates an opening through the shell of the cylinder, adjacent to the shoulder, 16; and 9 a valve which closes such opening, being held against the same by a spring, 10, the tension of which may be suitably regulated, so that the pressure or tension acquired by the air within the space 17 before the valve is lifted from its seat, can be controlled. In order to prevent an undesirable reduction of air pressure within the space 17, when the piston head moves away from the shoulder 16, I prefer to perforate the valve 9, and to provide a spring-actuated valve, 12, therefor, which allows the air to flow inward, but not outward.

When my invention is applied to an automatic air-brake system, as shown in Figs. 1 and 2, the communicating passage-way between the opposite ends of the cylinder is preferably a port or opening, 13, through the end wall of the piston head, which is covered on the inside by a valve, 14, held against its seat by a spring, 15. The tension of the spring, 15, is not great, so that when the compressed air from the train pipe, D, is admitted to the front end of the cylinder, this valve, 14, is moved from its seat and a free communication is established between the opposite ends of the cylinder, and the air pressure on the opposite ends of the piston is the same; but, as the area of the head end of the piston is greater than the area of the opposite end, the admission of the compressed air to the two ends of the cylinder simultaneously results in causing the piston to be moved inward into the cylinder, thus letting off the brakes.

A valve device E is interposed between the train pipe D and the head end of the cylinder; there being a port or passage-way, 24, in the cylinder casing which communicates with the port or passage-way, 25, in the casing of the valve device. 18 is a piston in the valve device E, arranged between the train pipe connection and the port 25, and 19 is a check valve which closes an opening through the piston 18, and is held against its seat by a spring 20. This valve opens toward the port, 25, so that the compressed air passes without serious interruption from the train pipe into the cylinder, but is checked by this valve, 19, from passing in the opposite direction. The piston, 18, is free to have a limited amount of motion within its casing, its normal position being away from the train pipe connection, where it is held by the pressure of the air in such pipe. When, however it is moved in the opposite direction by reason of the pressure in the train pipe being reduced below that within the cylinder, A, the piston, 18, is moved upward, or toward the train pipe connection, and,—the stem, 28, of the piston coming in contact with the inner wall of the casing of the valve device, E,—the valve, 19, is moved off its seat, so that the air in the head end of the brake cylinder can exhaust into the train pipe, and the confined compressed air in the rear end of the cylinder will force outward the piston, B, and set the brakes. Should the engineer at any time move his brake valve to cause a sudden stoppage of the train, the sudden exhaustion of the air from the train pipe will cause the piston, 18, to be moved an unusual extent toward the train pipe connection, so that an opening, 21, through the piston will be brought to register with an opening, 22, through the casing, E, and the air from the larger end of the brake cylinder will exhaust not only into the train pipe, but also in the open air. This tends to a more rapid setting of the brakes on each car, than when the exhaustion from the brake cylinders is through the train pipe only. In the ordinary use of the brakes, however, the openings, 21 and 22, are not brought into register.

In Fig. 4 is illustrated a form of my invention adapted for use upon street or tram cars. In this construction the piston, B, and the cylinder, A, are of substantially the same form and construction as are the like parts which have already been described. The communicating air passage-way between the opposite ends of the cylinder, instead of being through the piston head, is formed in the wall of the cylinder, and is represented at 13′, 13″, and in this passage-way is arranged the valve, 14′, which is under the control of the motorman or driver of the car. 30 is an exhaust passage-way adapted, by the movement of the valve 14′, to be brought into communication with the larger or head end of the cylinder; and 31 is a pipe, which may lead to the closed end of a brake device like that shown in Fig.

4, and situated on a succeeding car, which pipe 31 is adapted to be brought into communication with the passage 13' by the turning of the valve 14', which movement of the valve also places the head end of the cylinder in communication with the exhaust.

29 indicates a pump by which compressed air is supplied to the rear, or auxiliary reservoir end of the brake cylinder. This pump may be operated from the axle of the car, or otherwise, or in lieu of the pump other means for supplying compressed air to the brake cylinder may be employed.

It will be understood that when it is desired to apply the brakes the pump, 29, is started and the valve, 14', is turned so that the air will pass out from in front of the piston. The pressure upon the rear side of the piston being thus greater than that on the opposite side, the piston will be moved outward and the brakes applied. When the brakes are to be let off, the valve, 14', is turned so as to bring the opposite ends of the cylinder into communication,—through the passage-way, 13', 13",—the action of the pump in the mean time having stopped. This action causes the pressure at the opposite sides of the piston to be uniform, but, the area of the head end of the piston being greater than the area of the opposite end, the piston is moved into the cylinder, and the brakes are taken off. It will be observed that by the use of my invention in a device of the character just described, the compressed air is stored up, and can be instantly used, so that the brakes can be set one or more times without the pump being put into operation.

It often happens that there are leaks in the train pipe of an automatic air brake system, so that the pressure therein is reduced—provided the amount of the leakage be greater than the ordinary supply to the pipe,—and this would result in a setting of the brakes unless provision were made to prevent it. With this end in view, I provide the stem, 5, of the piston with a hole, 32, and form a hole, 33, through the wall of the cylinder, these two holes being in such relation to each other that they are brought into communication whenever the piston is moved outward a short distance.

34 is a valve held in place to cover the opening, 33, so as to prevent the inward passage of air through it, while it allows the escape of air in the opposite direction. The hole, 32, is small, say one-sixteenth of an inch in diameter, while the hole, 33, can be about twice that size. I prefer that the hole, 32, should enter the bottom of one of the grooves, 7, and that the packing, 27, should not fill the groove immediately adjacent to this hole, as this will insure a communication between the holes, 32 and 33, even though they are not directly in line with each other.

When the piston is caused to move by reason of there being a leakage somewhere in the train pipe its motion is necessarily slow, so that when the two holes, 32 and 33, are brought into communication by such movement they will not pass each other until so much air will have escaped from the auxiliary reservoir that the pressure therein will not be sufficiently in excess of that in the train pipe to cause the brakes to be set. When the pressure in the train pipe is intentionally reduced, the piston moves rapidly, and the hole, 32, is carried past the hole, 33, so quickly that the amount of leakage through the vent holes, 32 and 33, is insignificant.

What I claim as my invention is—

1. In an air-brake apparatus, the combination of a brake cylinder having two bearing surfaces for the piston of different diameters and a closed rear end, a piston therein connected with the brake and having a head and an elongated hollow stem portion communicating freely with the rear end of the cylinder, and of smaller size than the head, connections for the brakes, and means whereby air under pressure can be forced into the cylinder, substantially as set forth.

2. In an air-brake apparatus, the combination of a brake cylinder, A, having the portions, 2 and 4, the former being the larger in diameter and the end of the cylinder adjacent to the portion 4 being closed, the piston, B, fitting in the cylinder, and having the head, 3, and the elongated stem, 5, the piston being hollow and communicating freely with one end of the cylinder, the connections between the piston and the brakes, the air passage-way between the opposite ends of cylinder and the valve therein, and means for supplying the cylinder with air under pressure, substantially as set forth.

3. In an air-brake apparatus, the combination of the piston, B, having the head, 3, and the elongated open ended stem, 5, grooved externally, as at 7, the packing material placed in the said grooves, and the cylinder, A, having the two bearing surfaces, 2 and 4, with which the head and the stem respectively of the piston engage, the bearing surface for the stem being of considerable length, substantially as set forth.

4. In an air-brake apparatus, the combination of the cylinder A, having the two portions, 2 and 4, of different sizes separated by the shoulder, 16, the piston fitting in the said cylinder, and having the head, 3, and the stem portion, 5, and the valve, 9, covering an opening into the space between the head of the piston and the shoulder, 16, substantially as set forth.

5. In an air-brake apparatus, the combination of the cylinder, A, having the two portions, 2 and 4, separated by a shoulder, 16, the piston in the cylinder, having the head, 3, and the stem portion, 5, the valve, 9, covering an opening into the space between the head of the piston and the shoulder, 16, the said valve being perforated, and the valve, 12, covering the perforation in the valve, 9, substantially as set forth.

6. In an air-brake-apparatus, the combination with the brake cylinder and the train pipe, of a valve device interposed between these two, and consisting of a casing, a piston mounted therein and free to slide to a limited extent, a spring actuated valve closing an opening in the piston against the passage of air toward the train pipe, and the valve stem, 28, adapted to engage with the valve casing when the valve moves toward the train pipe, to move its valve from its seat, substantially as set forth.

7. In an air-brake apparatus, the combination with the brake cylinder and the train pipe, of a valve device, E, interposed between these two, and consisting of a casing having a vent hole, 22, a piston, 18, therein having a vent hole, 21, adapted to be brought into register with the hole, 22, and a spring-actuated valve, 19, closing an opening in the piston against the passage of air from the cylinder to the train pipe, substantially as set forth.

8. In an automatic air-brake system, the combination with the train pipe, of the brake cylinder and piston therein, there being an air passage-way between the opposite ends of the cylinder, whereby the compressed air is admitted to the rear side of the piston and there stored, the piston having a vent hole, 32, adapted to be brought into communication with a hole in the wall of the cylinder, and the valve, 34, closing the last said hole against the inward passage of air, substantially as set forth.

In testimony whereof I affix my signature in presence of two witnesses.

JOHN H. O'HARA.

Witnesses:
WILLIAM RANKIN,
R. P. BIRD.